(12) United States Patent
Miloskovska et al.

(10) Patent No.: US 11,141,913 B2
(45) Date of Patent: Oct. 12, 2021

(54) COMPOSITION AND METHOD FOR POWDER BED FUSION

(71) Applicant: SABIC GLOBAL TECHNOLOGIES B.V., Bergen op Zoom (NL)

(72) Inventors: Elena Miloskovska, Breda (NL); Bruke Jofore, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 45 days.

(21) Appl. No.: 16/645,903

(22) PCT Filed: Sep. 21, 2018

(86) PCT No.: PCT/IB2018/057335
§ 371 (c)(1),
(2) Date: Mar. 10, 2020

(87) PCT Pub. No.: WO2019/058332
PCT Pub. Date: Mar. 28, 2019

(65) Prior Publication Data
US 2020/0276753 A1 Sep. 3, 2020

Related U.S. Application Data

(60) Provisional application No. 62/562,031, filed on Sep. 22, 2017.

(51) Int. Cl.
| | |
|---|---|
| *B29C 64/153* | (2017.01) |
| *B29C 64/357* | (2017.01) |
| *B33Y 10/00* | (2015.01) |
| *B33Y 40/10* | (2020.01) |
| *C08G 64/06* | (2006.01) |
| *C08G 73/10* | (2006.01) |
| *B33Y 70/00* | (2020.01) |

(52) U.S. Cl.
CPC .......... *B29C 64/153* (2017.08); *B29C 64/357* (2017.08); *C08G 64/06* (2013.01); *C08G 73/1046* (2013.01); *B33Y 10/00* (2014.12); *B33Y 40/10* (2020.01); *B33Y 70/00* (2014.12); *C08G 2140/00* (2013.01)

(58) Field of Classification Search
CPC ..... B29C 64/153; B29C 64/357; B33Y 10/00; B33Y 70/00; B33Y 40/00; B33Y 40/10
See application file for complete search history.

(56) References Cited

U.S. PATENT DOCUMENTS

| | | | |
|---|---|---|---|
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,983,093 A | 9/1976 | Williams, III et al. | |
| 4,443,591 A | 4/1984 | Schmidt et al. | |
| 5,304,329 A | 4/1994 | Dickens, Jr. et al. | |
| 6,031,063 A * | 2/2000 | Day | C08G 64/20 528/196 |
| 2005/0288407 A1* | 12/2005 | Heuer | C08K 5/42 524/155 |
| 2015/0024317 A1 | 1/2015 | Orrock et al. | |
| 2020/0140706 A1* | 5/2020 | Pfister | B33Y 70/00 |

FOREIGN PATENT DOCUMENTS

| | | |
|---|---|---|
| WO | 2015157148 A1 | 10/2015 |
| WO | 2016209870 A1 | 12/2016 |
| WO | 2017033146 A1 | 3/2017 |
| WO | 2017040893 A1 | 3/2017 |
| WO | 2018119409 A1 | 6/2018 |
| WO | 2018197577 A1 | 11/2018 |

OTHER PUBLICATIONS

International Search Report dated Jan. 16, 2019; International Application No. PCT/IB2018/057335; International Filing Date Sep. 21, 2018 (6 pages).
Singh et al., "Effective Use of Recycled Raw Material in Selective Laser Sintering Process" SSRG International Journal of Mechanical Engineering (SSRG-IJME), vol. 21, Issue 7, Jul. 2015 (7 pages).
Written Opinion dated Jan. 16, 2019; International Application No. PCT/IB2018/057335; International Filing Date Sep. 21, 2018 (8 pages).
Written Opinion, dated Sep. 9, 2019; International Application No. PCT/IB2018/057335; International Filing Date Sep. 21, 2018 (6 pages).

\* cited by examiner

*Primary Examiner* — Mary Lynn F Theisen
(74) *Attorney, Agent, or Firm* — Cantor Colburn LLP

(57) ABSTRACT

A composition for use in powder bed fusion includes a thermoplastic powder that itself includes an induced crystalline polycarbonate or an induced crystalline polyetherimide. The thermoplastic powder is recycled powder, which means that it is recovered from a powder bed that had undergone a powder bed fusion process. Also described is a method of making an article, the method including: placing an induced crystalline polymeric (polycarbonate or polyetherimide) powder in a powder bed, fusing a portion of the induced crystalline polymeric powder in the powder bed, recovering a least a portion of the crystalline polymeric powder from the powder bed, wherein the recovered powder is not fused, placing the recovered induced crystalline polymeric powder in a second powder bed, and fusing at least a portion of the recovered induced crystalline polymeric powder in the second powder bed to form an amorphous polymer article.

8 Claims, 3 Drawing Sheets

COMPOSITION AND METHOD FOR POWDER BED FUSION

CROSS-REFERENCE TO RELATED APPLICATIONS

This application is a National Stage application of PCT/IB2018/057335, filed Sep. 21, 2018, which claims the benefit of U.S. Provisional Application No. 62/562,031, filed Sep. 22, 2017, both of which are incorporated by reference herein in their entirety.

BACKGROUND OF THE INVENTION

The present invention relates to compositions and methods for three dimensional printing (also known as additive manufacturing) using recycled powder selected from recycled induced crystallinity polycarbonate (hereinafter "PC") powder and recycled induced crystallinity polyetherimide (hereinafter "PEI") powder.

3D printing of thermoplastic powders is performed through powder bed fusion. In powder bed fusion, thermal energy selectively discretely fuses the thermoplastic particles in selected regions of a powder bed to form the desired fused article. Powder bed fusion processes suitable for thermoplastic powders include, but are not limited to, selective laser sintering (SLS) and multijet fusion.

There remains a desire for semicrystalline polycarbonate and polyetherimide powders that can be used in powder bed fusion and be recovered with minimal changes in properties for reuse in powder bed fusion.

BRIEF SUMMARY OF EMBODIMENTS OF THE INVENTION

One embodiment is a composition for use in powder bed fusion comprising: a thermoplastic powder comprising induced crystalline polycarbonate or induced crystalline polyetherimide wherein said thermoplastic powder is recycled powder.

Another embodiment is a method of making an article, the method comprising: a) converting an amorphous polymer to an induced crystalline polymeric powder wherein the amorphous polymer is polycarbonate or polyetherimide, b) placing the induced crystalline polymeric powder in a powder bed, c) fusing a portion of the induced crystalline polymeric powder in the powder bed, d) recovering a least a portion of the crystalline polymeric powder from the powder bed, wherein the recovered powder is not fused, e) placing the recovered induced crystalline polymeric powder in a second powder bed, and f) fusing at least a portion of the recovered induced crystalline polymeric powder in the second powder bed to form an amorphous polymer article.

These and other embodiments are described in detail below.

DETAILED DESCRIPTION OF THE INVENTION

Figure 1:
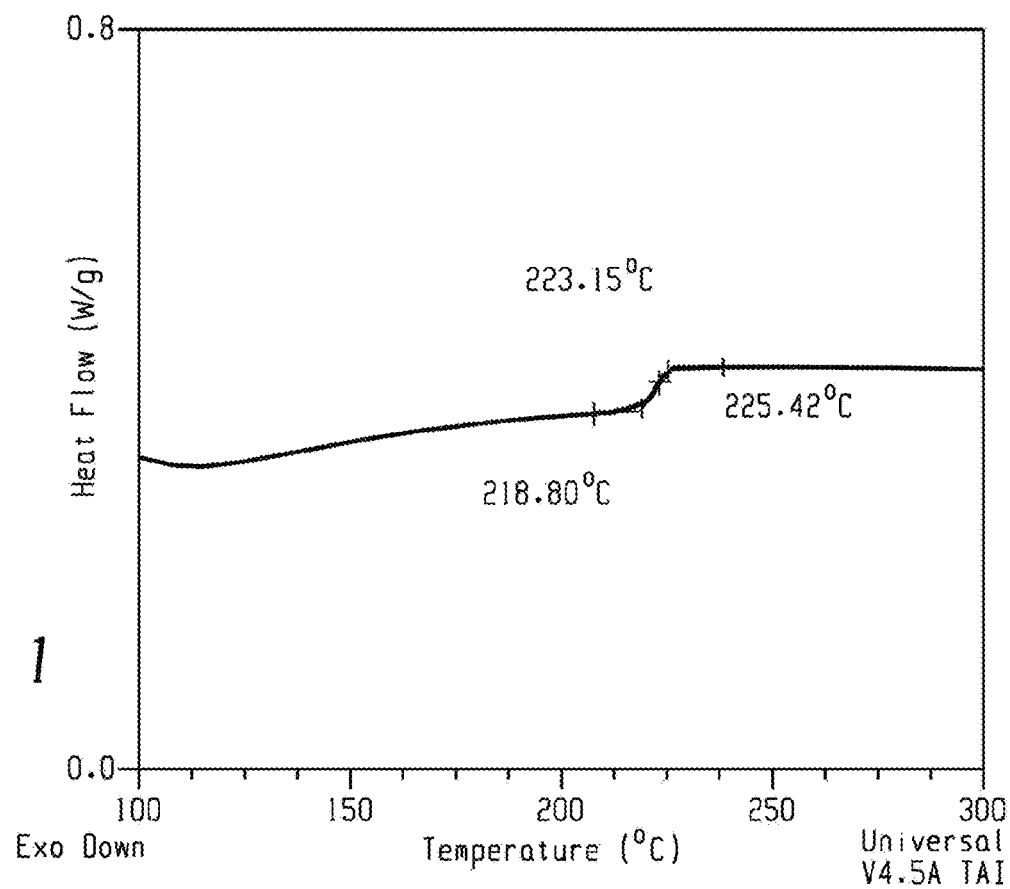
FIG. 1 is a differential scanning calorimetry scan of an amorphous polyetherimide.

One embodiment is a composition for use in powder bed fusion comprising: a thermoplastic powder comprising induced crystalline polycarbonate or induced crystalline polyetherimide wherein said thermoplastic powder is recycled powder. In the context of the terms "induced crystalline polycarbonate" and "induced crystalline polyetherimide," the modifier "induced crystalline" means that polymer is semicrystalline (e.g., 10 to 60 percent crystalline) and prepared by starting with a corresponding amorphous polymer and inducing crystallization to form a semicrystalline polymer.

As defined herein, "recycled powder" (hereinafter also "recovered powder") is polycarbonate or polyetherimide powder recovered from a powder bed that had undergone a powder bed fusion process. In some embodiments, the recycled powder does not have significant changes in weight average molecular weight (Mw), viscosity (determined as melt volume-flow rate, or MVR), or crystallinity (determined by differential scanning calorimetry, or DSC) as compared to virgin induced crystalline polycarbonate or polyetherimide. In this context, a "significant change" is a change greater than 10 percent. By comparison, powder bed fusion of amorphous polycarbonate or polyetherimide powder typically results in greater than 10 percent changes to the weight average molecular weight, viscosity, and crystallinity of unfused powder remaining in the powder bed after performing a powder bed fusion process on the amorphous powder.

In some embodiments, the thermoplastic powder comprises the induced crystalline polycarbonate. A polycarbonate is a polymer comprising carbonate repeat units having the structure

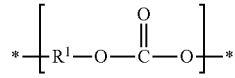

wherein at least 60 percent of the total number of $R^1$ groups are aromatic divalent groups. In some embodiments, the aromatic divalent groups are $C_6$-$C_{24}$ aromatic divalent groups. When not all $R^1$ groups are aromatic, the remainder are $C_2$-$C_{24}$ aliphatic divalent groups. In some embodiments, each $R^1$ is a radical of the formula

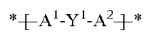

wherein each of $A^1$ and $A^2$ is independently a monocyclic divalent aryl radical and $Y^1$ is a bridging radical having one or two atoms that separate $A^1$ from $A^2$. Examples of $A^1$ and $A^2$ include 1,3-phenylene and 1,4-phenylene, each optionally substituted with one, two, or three $C_1$-$C_6$ alkyl groups. In some embodiments, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. In some embodiments, $Y^1$ is methylene (—$CH_2$—; also known as methylidene), ethylidene (—$CH(CH_3)$—), isopropylidene (—$C(CH_3)_2$—), or cyclohexylidene. In some embodiments, the divalent carbonate repeat unit is free of alkoxyl substituents.

In a very specific embodiment, the polycarbonate comprises carbonate repeat units having the structure

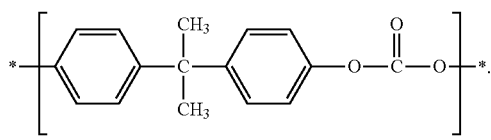

In some embodiments, the polycarbonate consists essentially of carbonate repeat units of this type. In this context, "consisting essentially of" allows for minor amounts of polymer end units and/or polymer branching units.

There is no particular limit on the structure of end groups on the polycarbonate. Suitable chain stopper agents (also known as chain terminating agents) can be included during polymerization to provide end groups. Chain stopper agents include, for example, monocyclic phenols such as phenol, p-cyanophenol, and $C_1$-$C_{22}$ alkyl-substituted phenols such as p-cumylphenol, resorcinol monobenzoate, and p-tertiarybutylphenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

In some embodiments, the polycarbonate has a weight average molecular weight of 15,000 to 50,000 grams/mole, specifically 15,000 to 40,000 grams/mole, as determined by gel permeation chromatography using bisphenol A polycarbonate standards. Methods of preparing polycarbonates are known in the art.

Suitable methods for preparing a virgin (i.e., not yet recycled) thermoplastic powder comprising induced crystalline polycarbonate are described in V. Kalyanaraman et al., "Improved Manufacturability of Amorphous Polymers in Powder Bed Fusion Process," International Publication Number WO 2016/209870 A1, published 29 Dec. 2016; and C. A. Leenders, "Method of Producing Crystalline Polycarbonate Powders," International Publication Number WO 2017/033146 A1, published 2 Mar. 2017. An alternative method, illustrated in the working examples below, comprises exposing an amorphous polycarbonate powder to a mixture of a $C_3$-$C_5$ ketone and a $C_1$-$C_3$ alcohol, followed by drying. The $C_3$-$C_5$ ketone and the $C_1$-$C_3$ alcohol can be used in a weight ratio of 1.5:1 to 5:1, specifically 2:1 to 4:1. Suitable $C_3$-$C_5$ ketones include acetone, methyl ethyl ketone, methyl isopropyl ketone, and combinations thereof. Suitable $C_1$-$C_3$ alcohols include methanol, ethanol, 1-propanol, 2-propanol, and combinations thereof. Exposure of the amorphous polycarbonate powder to the ketone/alcohol mixture can be conducted at a temperature of 10 to 40° C., specifically 15 to 35° C., and for a time of 5 to 50 hours, specifically 10 to 35 hours.

The thermoplastic powder comprising the induced crystalline polycarbonate can comprise small but detectable levels of solvents used in its preparation. For example, in some embodiments, the thermoplastic powder comprising the induced crystalline polycarbonate further comprises, based on the weight of the thermoplastic powder, 0.5 to 100 parts per million by weight, specifically 0.5 to 50 parts per million by weight, more specifically 0.5 to 20 parts per million by weight, of methanol. In very specific embodiments, the thermoplastic powder comprising the induced crystalline induced crystalline polycarbonate further comprises, based on the weight of the thermoplastic powder, 0.5 to 100 parts per million by weight, specifically 0.5 to 50 parts per million by weight, more specifically 0.5 to 20 parts per million by weight, of methanol; and 0.5 to 100 parts per million by weight, specifically 0.5 to 50 parts per million by weight, more specifically 0.5 to 20 parts per million by weight, of acetone. Parts per million levels of methanol and acetone can be determined by gas chromatography—mass spectrometry.

The thermoplastic powder can comprise the induced crystalline polyetherimide. Polyetherimides are polymers comprising repeat units having the formula

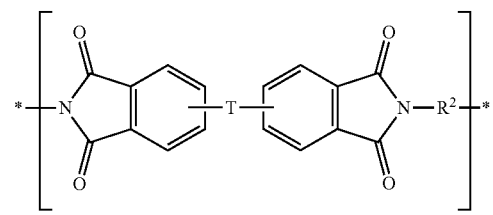

wherein T is —O— or a group of the Formula —O—Z—O— wherein the divalent bonds of the —O— or the —O—Z—O— group are in the 3,3', 3,4', 4,3', or the 4,4' positions of the phthalimide groups; Z includes divalent moieties of the formula

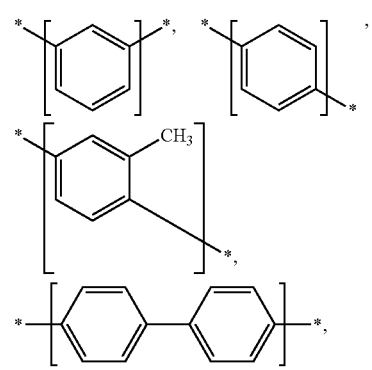

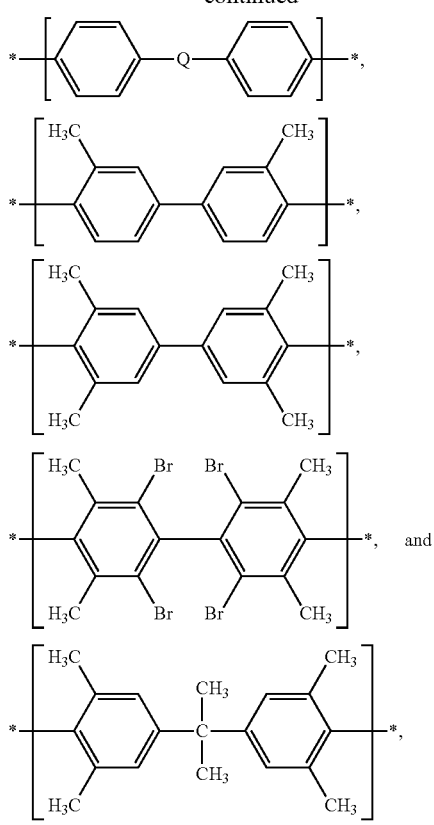

wherein Q is a divalent moiety that can be —O—, —S—, —C(O)—, —SO$_2$—, —SO—, —C$_y$H$_{2y}$— wherein y is 1 to 8, or —C$_p$H$_q$F$_r$— wherein p is 1 to 8 and q is 0 to 15 and r is 1 to 16 and q+r=2p; and R$^2$ is independently at each occurrence a divalent group selected from the group consisting of substituted or unsubstituted divalent aromatic hydrocarbon moieties having 6 to 20 carbons, straight or branched chain alkylene moieties having 2 to 20 carbons, cycloalkylene moieties having 3 to 20 carbon atom, and divalent moieties of the general formula

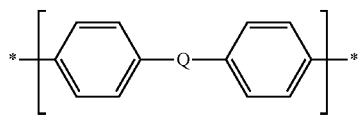

wherein Q is defined above. As used herein, "substituted" means including at least one substituent such as a halogen (i.e., F, Cl, Br, I), hydroxyl, amino, thiol, carboxyl, carboxylate, amide, nitrile, sulfide, disulfide, nitro, C$_1$-C$_{18}$ alkyl, C$_1$-C$_{18}$ alkoxyl, C$_6$-C$_{18}$ aryl, C$_6$-C$_{18}$ aryloxyl, C$_7$-C$_{18}$ alkylaryl, or C$_7$-C$_{18}$alkylaryloxyl. So, when the hydrocarbyl residue is described as substituted, it can contain heteroatoms in addition to carbon and hydrogen.

In some embodiments, each occurrence of R$^2$ is independently para-phenylene or meta-phenylene, and T is a divalent moiety of the formula

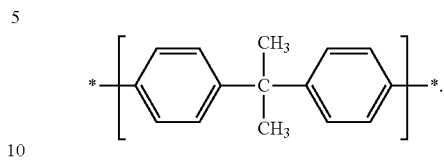

In some embodiments, the polyetherimide is free of halogens. The number of repeat units in the polyetherimide can be, for example, 10 to 1,000, or 10 to 500.

In some embodiments, the polyetherimide comprises 10 to 1000 repeat units, each repeat unit independently having the structure

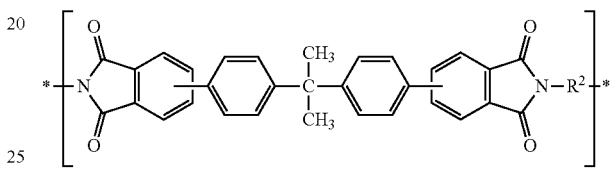

wherein R$^2$ is meta-phenylene or para-phenylene. In these embodiments, the polyetherimide can be referred to as poly[2,2'-bis(4-(3,4-dicarboxyphenoxy)phenylpropane)-1,3-phenylene bisimide].

Included among many methods of synthesizing polyetherimides are those disclosed in U.S. Pat. No. 3,847,867 to Heath et al., U.S. Pat. No. 3,850,885 to Takekoshi et al., U.S. Pat. Nos. 3,852,242 and 3,855,178 to White, U.S. Pat. No. 3,983,093 to Williams et al., and U.S. Pat. No. 4,443,591 to Schmidt et al. Polyetherimides are also commercially available as, for example, ULTEM™ resins from SABIC.

Suitable methods for preparing a virgin (i.e., not yet recycled) thermoplastic powder comprising induced crystalline polyetherimide are described in V. Kalyanaraman et al., "Improved Manufacturability of Amorphous Polymers in Powder Bed Fusion Process," International Publication Number WO 2016/209870 A1, published 29 Dec. 2016; and B. P. Price et al., "Polyetherimide Powders for Additive Manufacturing," International Publication Number WO 2018/119409 A1, published 28 Jun. 2018. In an alternative method, illustrated in the working examples below, an amorphous polyetherimide can be converted to an induced crystalline polymeric powder by exposure to a halogenated aromatic solvent, such as ortho-dichlorobenzene, followed by washing with a ketone solvent, such as acetone, and drying. Exposure of the amorphous polyetherimide powder to the halogenated aromatic solvent can be conducted at a temperature of 120 to 170° C., specifically 130 to 155° C., and for a time of 20 to 200 minutes, specifically 40 to 150 minutes.

In some embodiments, the thermoplastic powder comprising the induced crystalline polyetherimide has a weight average molecular weight of 15,000 to 50,000 grams/mole, specifically 25,000 to 50,000 grams/mole, determined by gel permeation chromatography using poly[2,2'-bis(4-(3,4-dicarboxyphenoxy)phenylpropane)-1,3-phenylene bisimide] standards; and the thermoplastic powder comprises, based on the weight of the thermoplastic powder, 10 to 500 parts per million by weight, specifically 20 to 500 parts per million by weight, more specifically 50 to 500 parts per million by weight of ortho-dichlorobenzene. Parts per million levels of ortho-dichlorobenzene can be determined by gas chromatography—mass spectrometry.

The thermoplastic powder comprises the induced crystalline polycarbonate or the induced crystalline polyetherimide in an amount of 98 to 100 weight percent, based on the weight of the thermoplastic powder. Within this range, the amount of the induced crystalline polycarbonate or the induced crystalline polyetherimide can be 99 to 100 weight percent. The thermoplastic powder can, optionally, include up to 2 weight percent, or up to 1 weight percent, based on the weight of the thermoplastic powder, of an additive selected from the group consisting of stabilizers, antioxidants, processing aids, drip retardants, UV blockers, dyes, pigments, anti-static agents, metal deactivators, flow-promoting agents, and combinations thereof. Flow-promoting agents for powder bed fusion include, for example, metal oxides, mixed metal oxides, and combinations thereof. Specific flow-promoting agents include fumed silica, fumed aluminum oxide, hydrated silica, amorphous alumina, glassy silica, titania, and combinations thereof. In some embodiments, the flow-promoting agent comprises fumed silica.

In some embodiments, the thermoplastic powder, whether comprising polycarbonate or polyetherimide, has a particle size distribution, determined by laser diffraction according to ISO 13320-1, characterized by a Dv10 value in a range of 10 to 50 micrometers (i.e., 90 number percent of the particles have a volume average equivalent circular diameter that is greater than a diameter in the range 10 to 50 micrometers), specifically 20 to 40 micrometers; a Dv50 value in a range of 30 to 90 micrometers (i.e., 50 number percent of the particles have a volume average equivalent circular diameter that is greater than, and 50 number percent of the particles have a volume average equivalent circular diameter that is less than, a diameter in the range of 30 to 90 micrometers), specifically 40 to 80 micrometers; and a Dv90 value in a range of 100 to 150 micrometers (i.e., 90 number percent of the particles have a volume average equivalent circular diameter that is less than a diameter in the range 100 to 150 micrometers), specifically 100 to 140 micrometers.

The invention includes a method of making an article, the method comprising: a) converting an amorphous polymer to an induced crystalline polymeric powder wherein the amorphous polymer is polycarbonate or polyetherimide, b) placing the induced crystalline polymeric powder in a powder bed, c) fusing a portion of the induced crystalline polymeric powder in the powder bed, d) recovering a least a portion of the crystalline polymeric powder from the powder bed, wherein the recovered powder is not fused, e) placing the recovered induced crystalline polymeric powder in a second powder bed, and f) fusing at least a portion of the recovered induced crystalline polymeric powder in the second powder bed to form an amorphous polymer article.

The method includes converting an amorphous polymer to an induced crystalline polymeric powder wherein the amorphous polymer is polycarbonate or polyetherimide. When the amorphous polymer is polycarbonate, methods for converting to an induced crystalline polymeric powder are described in V. Kalyanaraman et al., "Improved Manufacturability of Amorphous Polymers in Powder Bed Fusion Process," International Publication Number WO 2016/209870 A1, published 29 Dec. 2016; and C. A. Leenders, "Method of Producing Crystalline Polycarbonate Powders," International Publication Number WO 2017/033146 A1, published 2 Mar. 2017. An alternative method, illustrated in the working examples below, comprises exposing an amorphous polycarbonate powder to a mixture of a $C_3$-$C_5$ ketone and a $C_1$-$C_3$ alcohol, followed by drying. The $C_3$-$C_5$ ketone and the $C_1$-$C_3$ alcohol can be used in a weight ratio of 1.5:1 to 5:1, specifically 2:1 to 4:1. Suitable $C_3$-$C_5$ ketones include acetone, methyl ethyl ketone, methyl isopropyl ketone, and combinations thereof. Suitable $C_1$-$C_3$ alcohols include methanol, ethanol, 1-propanol, 2-propanol, and combinations thereof. Exposure of the amorphous polycarbonate powder to the ketone/alcohol mixture can be conducted at a temperature of 10 to 40° C., specifically 15 to 35° C., and for a time of 5 to 50 hours, specifically 10 to 35 hours.

As illustrated in the working examples below, when the amorphous powder is polyetherimide, it can be converted to an induced crystalline polymeric powder by exposure to a halogenated aromatic solvent, such as ortho-dichlorobenzene, followed by washing with a ketone solvent, such as acetone, and drying. Exposure of the amorphous polyetherimide powder to the halogenated aromatic solvent can be conducted at a temperature of 120 to 170° C., specifically 130 to 155° C., and for a time of 20 to 200 minutes, specifically 40 to 150 minutes.

The method further includes placing the induced crystalline polymeric powder in a powder bed, and fusing a portion of the induced crystalline polymeric powder in the powder bed. These steps are routine in powder bed fusion, and details of their implementation are known to those skilled in the art.

The method further includes recovering a least a portion of the crystalline polymeric powder from the powder bed, wherein the recovered powder is not fused. For example, the powder cake including the unfused powder and the printed parts embedded in the cake can be removed from the three-dimensional printer; the powder cake can then be broken up, and the printed part separated; the remaining unfused powder can be crushed and re-sieved to remove any large agglomerates to yield the recovered crystalline polymeric powder.

The method further includes placing the recovered induced crystalline polymeric powder in a second powder bed, and fusing at least a portion of the recovered induced crystalline polymeric powder in the second powder bed to form an amorphous polymer article. These steps are differ from standard powder bed fusion steps only in that the powder comprises recovered powder, rather than being virgin powder. The powder used in the second powder bed can comprise 50 to 100 weight percent recovered powder, with the balance being virgin powder.

In some embodiments of the method, the amorphous polymer comprises polycarbonate. In these embodiments, the induced crystalline polymeric powder can, optionally, comprise, based on the weight of the induced crystalline polymeric powder, 0.5 to 100 parts per million by weight, specifically 0.5 to 50 parts per million by weight, more specifically 0.5 to 20 parts per million by weight, of methanol. In specific embodiments, the induced crystalline polymeric powder comprises, based on the weight of the induced crystalline polymeric powder, 0.5 to 100 parts per million by weight, specifically 0.5 to 50 parts per million by weight, more specifically 0.5 to 20 parts per million by weight, of methanol; and 0.5 to 100 parts per million by weight, specifically 0.5 to 50 parts per million by weight, more specifically 0.5 to 20 parts per million by weight, of acetone.

In other embodiments, the amorphous polymer comprises polyetherimide. In these embodiments, the induced crystalline polymeric powder can, optionally, have a weight average molecular weight of 15,000 to 50,000 grams/mole, specifically 25,000 to 50,000 grams/mole, determined by gel permeation chromatography using poly[2,2'-bis(4-(3,4-dicarboxyphenoxy)phenylpropane)-1,3-phenylene bisimide] standards; and comprises, based on the weight of the induced crystalline polymeric powder, 10 to 500 parts per million by weight, specifically 20 to 500 parts per million by weight, more specifically 50 to 500 parts per million by weight of ortho-dichlorobenzene.

In some embodiments of the method, the induced crystalline polymeric powder, whether comprising polycarbonate or polyetherimide, has a particle size distribution, determined by laser diffraction according to ISO 13320-1, characterized by a Dv10 value in a range of 10 to 50 micrometers, specifically 20 to 40 micrometers; a Dv50 value in a range of 30 to 90 micrometers, specifically 40 to 80 micrometers; and a Dv90 value in a range of 100 to 150 micrometers, specifically 100 to 140 micrometers.

Another embodiment is a method of making an article, the method comprising placing an induced crystalline polymeric powder in a powder bed, wherein the induced crystalline polymeric powder is an induced crystalline polycarbonate powder or an induced crystalline polyetherimide powder; fusing a portion of the induced crystalline polymeric powder in the powder bed; recovering a least a portion of the induced crystalline polymeric powder from the powder bed, wherein the recovered induced crystalline polymeric powder is not fused; placing the recovered powder in a second powder bed, and fusing at least a portion of the recovered induced crystalline polymeric powder in the second powder bed to form an amorphous polymer article. In some embodiments, the induced crystalline polymeric powder is an induced crystalline polycarbonate powder. In other embodiments, the induced crystalline polymeric powder is an induced crystalline polyetherimide powder.

A further embodiment is an amorphous polycarbonate or polyetherimide article made by either of the above-described methods using the recycled powder.

The invention includes at least the following aspects.

Aspect 1: A composition for use in powder bed fusion comprising: a thermoplastic powder comprising induced crystalline polycarbonate or induced crystalline polyetherimide wherein said thermoplastic powder is recycled powder.

Aspect 2: The composition of aspect 1, wherein the thermoplastic powder comprises the induced crystalline polycarbonate.

Aspect 3: The composition of aspect 2, wherein the thermoplastic powder comprises, based on the weight of the thermoplastic powder, 0.5 to 100 parts per million by weight, specifically 0.5 to 50 parts per million by weight, more specifically 0.5 to 20 parts per million by weight, of methanol.

Aspect 4: The composition of aspect 2, wherein the thermoplastic powder comprises, based on the weight of the thermoplastic powder, 0.5 to 100 parts per million by weight, specifically 0.5 to 50 parts per million by weight, more specifically 0.5 to 20 parts per million by weight, of methanol; and 0.5 to 100 parts per million by weight, specifically 0.5 to 50 parts per million by weight, more specifically 0.5 to 20 parts per million by weight, of acetone.

Aspect 5: The composition of aspect 1, wherein the thermoplastic powder comprises the induced crystalline polyetherimide.

Aspect 6: The composition of aspect 5, wherein the thermoplastic powder has a weight average molecular weight of 15,000 to 50,000 grams/mole, specifically 25,000 to 50,000 grams/mole, determined by gel permeation chromatography using poly[2,2'-bis(4-(3,4-dicarboxyphenoxy)phenylpropane)-1,3-phenylene bisimide] standards; and wherein the thermoplastic powder comprises, based on the weight of the thermoplastic powder, 10 to 500 parts per million by weight, specifically 20 to 500 parts per million by weight, more specifically 50 to 500 parts per million by weight of ortho-dichlorobenzene.

Aspect 7: The composition of aspect 5, wherein the thermoplastic powder has a particle size distribution, determined by laser diffraction according to ISO 13320-1, characterized by a Dv10 value in a range of 10 to 50 micrometers, specifically 20 to 40 micrometers; a Dv50 value in a range of 30 to 90 micrometers, specifically 40 to 80 micrometers; and a Dv90 value in a range of 100 to 150 micrometers, specifically 100 to 140 micrometers.

Aspect 8: A method of making an article, the method comprising: a) converting an amorphous polymer to an induced crystalline polymeric powder wherein the amorphous polymer is polycarbonate or polyetherimide, b) placing the induced crystalline polymeric powder in a powder bed, c) fusing a portion of the induced crystalline polymeric powder in the powder bed, d) recovering a least a portion of the crystalline polymeric powder from the powder bed, wherein the recovered powder is not fused, e) placing the recovered induced crystalline polymeric powder in a second powder bed, and f) fusing at least a portion of the recovered induced crystalline polymeric powder in the second powder bed to form an amorphous polymer article.

Aspect 9: The method of aspect 8, wherein the amorphous polymer is polycarbonate.

Aspect 10: The method of aspect 9, wherein the induced crystalline polymeric powder comprises, based on the weight of the induced crystalline polymeric powder, 0.5 to 100 parts per million by weight, specifically 0.5 to 50 parts per million by weight, more specifically 0.5 to 20 parts per million by weight, of methanol.

Aspect 11: The method of aspect 9, wherein the induced crystalline polymeric powder comprises, based on the weight of the induced crystalline polymeric powder, 0.5 to 100 parts per million by weight, specifically 0.5 to 50 parts per million by weight, more specifically 0.5 to 20 parts per million by weight, of methanol; and 0.5 to 100 parts per million by weight, specifically 0.5 to 50 parts per million by weight, more specifically 0.5 to 20 parts per million by weight, of acetone.

Aspect 12: The method of aspect 8, wherein the amorphous polymer is polyetherimide.

Aspect 13: The method of aspect 12, wherein the induced crystalline polymeric powder has a weight average molecular weight of 15,000 to 50,000 grams/mole, specifically 25,000 to 50,000 grams/mole, determined by gel permeation chromatography using poly[2,2'-bis(4-(3,4-dicarboxyphenoxy)phenylpropane)-1,3-phenylene bisimide] standards; and wherein the induced crystalline polymeric powder comprises, based on the weight of the induced crystalline polymeric powder, 10 to 500 parts per million by weight, specifically 20 to 500 parts per million by weight, more specifically 50 to 500 parts per million by weight of ortho-dichlorobenzene.

Aspect 14: The method of aspect 8, wherein the induced crystalline polymeric powder has a particle size distribution, determined by laser diffraction according to ISO 13320-1, characterized by a Dv10 value in a range of 10 to 50 micrometers, specifically 20 to 40 micrometers; a Dv50 value in a range of 30 to 90 micrometers, specifically 40 to 80 micrometers; and a Dv90 value in a range of 100 to 150 micrometers, specifically 100 to 140 micrometers.

All cited patents, patent applications, and other references are incorporated herein by reference in their entirety.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Induced crystalline polycarbonate powder was prepared from amorphous bisphenol A polycarbonate powder. The amorphous powder was suspended in a 3:1 weight/weight mixture of acetone and methanol and stirred at 25° C. for 6 to 8 hours at ambient pressure (101 kilopascals). The powder was filtered and dried under vacuum at 100° C. for 17 hours. The resulting semicrystalline polycarbonate powder had a crystallinity of about 25 percent and a weight average molecular weight of about 22,000 grams/mole, determined by gel permeation chromatography using bisphenol A polycarbonate standards.

Induced crystalline polyetherimide powder was prepared by gradually adding amorphous polyetherimide powder (250 grams) to ortho-dichlorobenze (1250 milliliters) with stirring at 140° C. and ambient pressure (101 kilopascals) for 60 minutes, followed by cooling for 10 minutes under ambient conditions (23° C., 101 kilopascals). Stirring was provided by a Silverson L5M high speed mixer. The resulting mixture was filtered through a Whatman 1440-150 filter (8 micrometer pore size, 150 millimeters diameter). The filtrate was washed two times with 500 milliliters of acetone. The resulting powder was air dried under ambient conditions for four hours, then dried under vacuum at 200° C. for 144 hours to minimize residual levels of ortho-dichlorobenze and acetone. The yield was 90 percent. The resulting semicrystalline polyetherimide powder had a crystallinity of about 13 percent and a weight average molecular weight of 40,000 grams/mole, determined by gel permeation chromatography using poly[2,2'-bis(4-(3,4-dicarboxyphenoxy)phenylpropane)-1,3-phenylene bisimide] standards. Residual ortho-dichlorobenze was determined by gas chromatography—mass spectrometry to be less than 500 parts per million by weight.

The particle size distribution of the semicrystalline polyetherimide was determined by laser diffraction according to ISO 13320-1. Mastersizer™ particle size analyzers from Malvern Instruments are suitable laser diffraction instruments for determining particle size characteristics. The particle size distribution was characterized by a volume-based equivalent spherical diameter (Dv50) in the range of 50 to 65 micrometers, a Dv10 value greater than 30 micrometers (i.e., 90 number percent of particles had an equivalent circular diameter greater than 30 micrometers), and a Dv90 value less than 120 micrometers (i.e., 90 number percent of particles had an equivalent circular diameter less than 120 micrometers).

Figure 2:
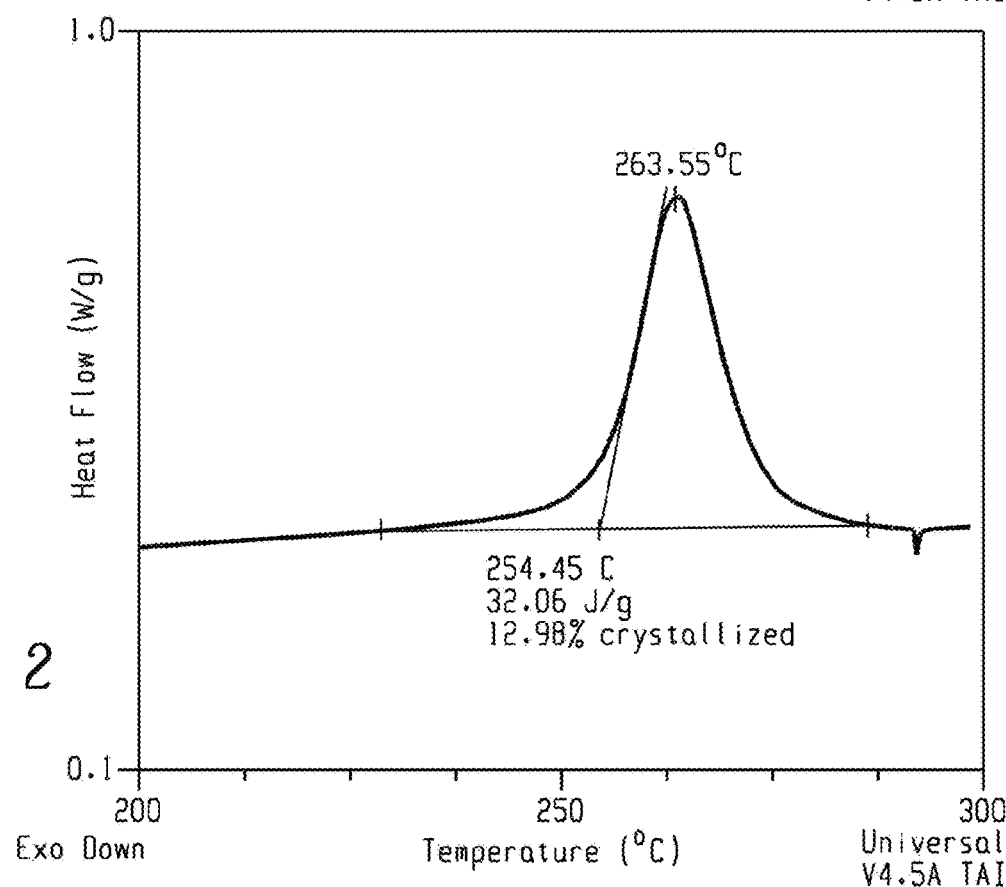
FIG. 2 is a differential scanning calorimetry scan of an induced crystalline polyetherimide.

FIG. 1 is a differential scanning calorimetry scan of the amorphous polyetherimide, showing a glass transition temperature of about 223° C. FIG. 2 is a differential scanning calorimetry scan of the induced crystalline polyetherimide, showing a melting temperature of about 263.5° C.

Nylon 12 having a melt volume-flow rate of about 58 centimeter$^3$/10 minutes determined according to ASTM D1238-13 at 235° C. and 5 kilogram load was obtained in powder form as DURAFORM™ PA12 resin from Evonik.

The following properties were analyzed and used as indicators of chemical changes in the powder that might affect recyclability: weight average molecular weight ($M_w$), determined by gel permeation chromatography using bisphenol A polycarbonate standards for polycarbonate samples, and polyetherimide standards for polyetherimide samples; melt volume-flow rate, determined according to ASTM D1238-13 at 300° C. and 1.2 kilogram load for polycarbonate samples, 350° C. and 5 kilogram load for polyetherimide samples, and 235° C. and 5 kilogram load for Nylon 12 samples; and crystallinity, determined by differential scanning calorimetry according to ASTM D3418-15 at a heating rate of 20° C./minute.

In order to mimic the sintering process and estimate the recyclability of recovered powders, induced crystalline polycarbonate and polyetherimide powders were exposed to an elevated temperature corresponding to the platform temperature ($T_{bed}$) in a Selective Laser Sintering machine. This temperature was 170° C. for polycarbonate, 240° C. for polyetherimide, and 160° C. for Nylon 12. Samples were held under vacuum at the stated temperatures for conditioning times of 7, 24, 48, 72, and 96 hours. For comparison, one sintering cycle can last about eight hours.

Figure 3:
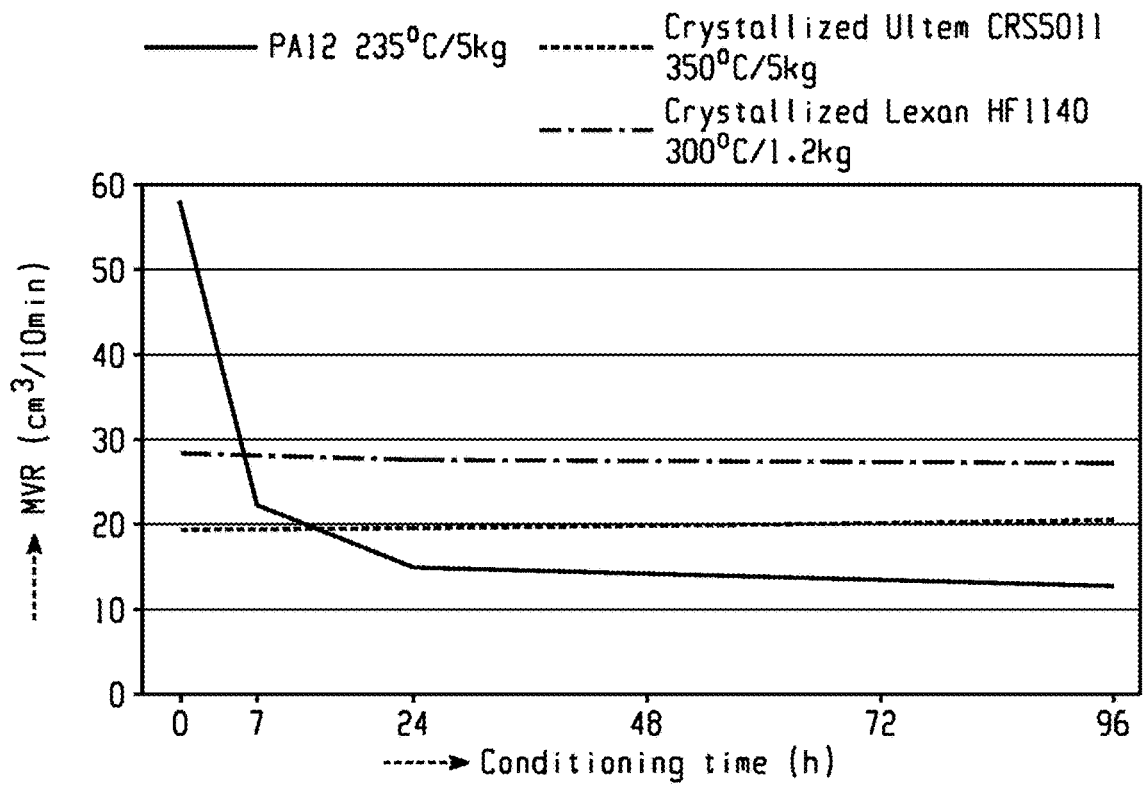
FIG. 3 is a plot of melt volume-flow rate as a function of conditioning time for Nylon 12, crystalline polycarbonate, and crystalline polyetherimide.

FIG. 3 is a plot of melt volume-flow rate (in units of centimeter$^3$/10 minutes) as a function of conditioning time (in units of hours) for Nylon 12 ("PA12"), crystalline polycarbonate ("Crystallized Lexan™ HF1140"), and crystalline polyetherimide ("Crystallized Ultem™ CRS5011"). The results show that Nylon 12 suffers a dramatic loss in melt flow over the course of 96 hours, while crystalline polycarbonate (higher) and crystalline polyetherimide (lower) exhibit essentially no loss of melt flow over the same period.

Figure 4:
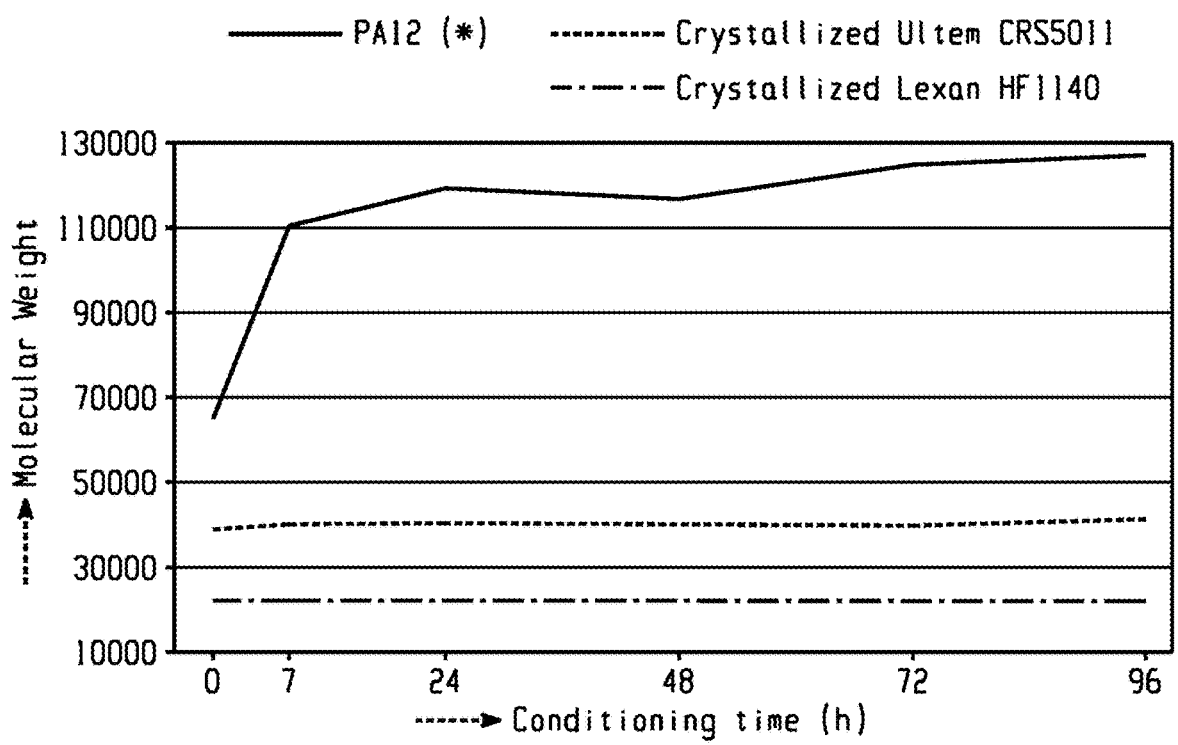
FIG. 4 is a plot of weight average molecular weight (in units of grams/mole) as a function of conditioning time (in units of hours) for Nylon 12, semicrystalline polycarbonate, and semicrystalline polyetherimide.

FIG. 4 is a plot of weight average molecular weight (in units of grams/mole) as a function of conditioning time (in units of hours) for Nylon 12 ("PA12"), crystalline polycarbonate ("Crystallized Lexan™ HF1140"), and crystalline polyetherimide ("Crystallized Ultem™ CRS5011"). The results show that Nylon 12 exhibits a large increase in molecular weight over the course of 96 hours, while the molecular weights of crystalline polycarbonate (lower) and crystalline polyetherimide (higher) are essentially constant over the same period.

Figure 5:
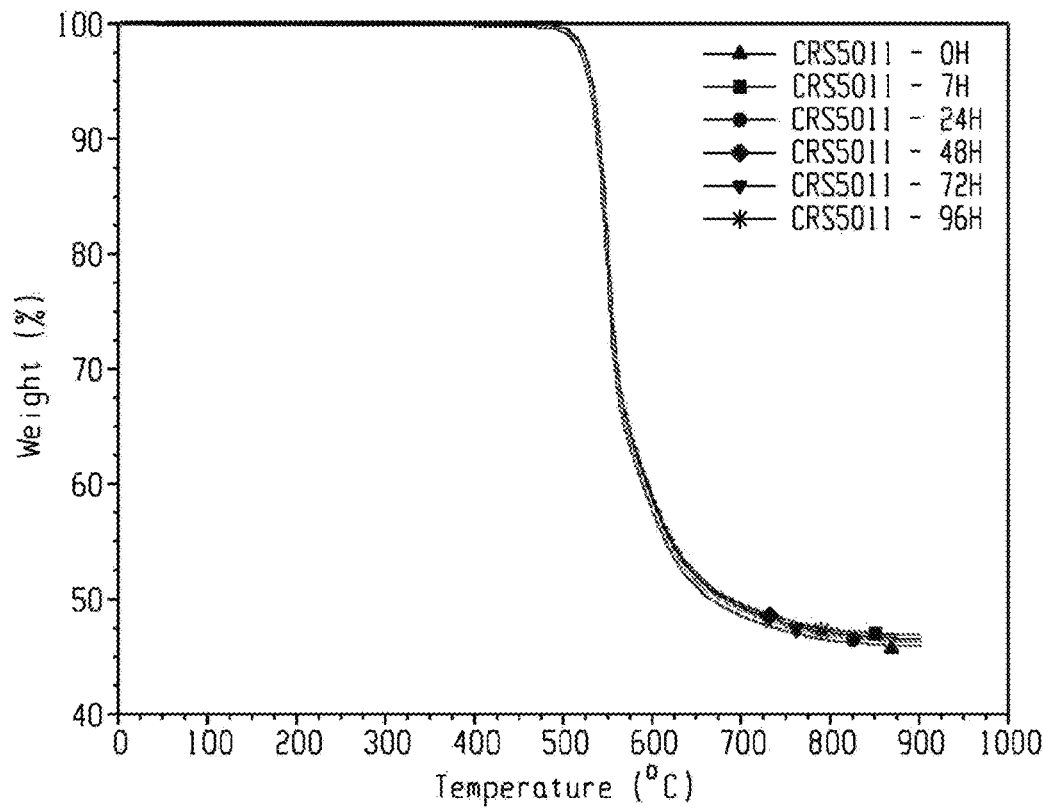
FIG. 5 overlays thermogravimetric analysis curves for six semicrystalline polyetherimide samples conditioned for 0, 7, 24, 42, 72, and 96 hours at 240° C. under vacuum.

FIG. 5 overlays thermogravimetric analysis curves for six crystalline polyetherimide samples conditioned for 0, 7, 24, 42, 72, and 96 hours at 240° C. under vacuum. Thermogravimetric analysis was conducted according to ASTM E1131-08(2014) under a nitrogen atmosphere and at a heating rate of 20° C./minute. There is essentially no difference between the curves, each of which exhibits a degradation onset temperature in the range 450-465° C.

Figure 6:
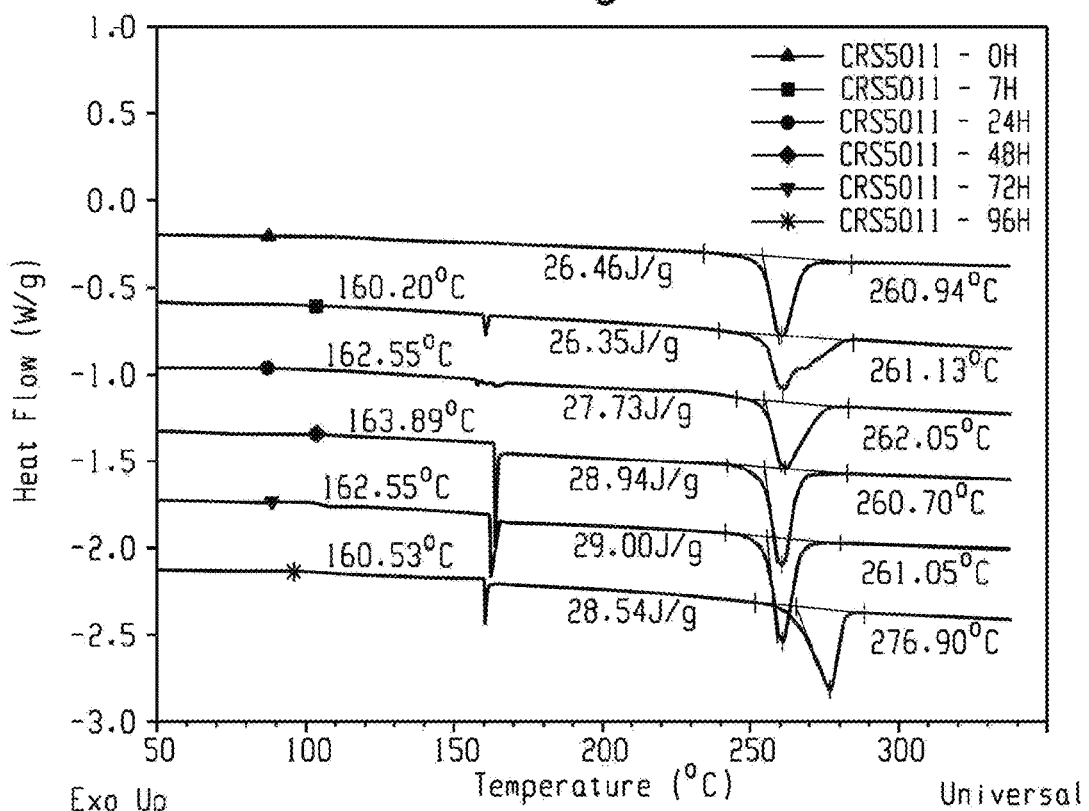
FIG. 6 overlays differential scanning calorimetry scans for six semicrystalline polyetherimide samples conditioned for 0, 7, 24, 42, 72, and 96 hours at 240° C. under vacuum.

FIG. 6 overlays differential scanning calorimetry scans for six crystalline polyetherimide samples conditioned for 0, 7, 24, 42, 72, and 96 hours (top to bottom) at 240° C. under vacuum. The curves are very similar for 0, 7, 24, 42, and 72 hours, but from 72 to 96 hours an increase in melting temperature from about 261° C. to about 277° C. was observed. Such an increase in melting temperature would not preclude recycling, but it would require an adjustment in sintering conditions.

These results collectively demonstrate that the induced crystalline polycarbonate and polyetherimide powders are expected to be 100% recyclable over multiple sintering cycles. The advantage that induced crystalline polycarbonate and polyetherimide powders have in terms of recyclability when compared to other semicrystalline powders, such as Nylon 12, is that during the laser sintering process they do not undergo significant changes in weight average molecular weight, melt volume-flow rate, or degree of crystallinity, whereas Nylon 12 does undergo significant changes in these properties, with the consequence that it cannot be 100% recycled even once without causing deterioration of mechanical properties in the printed product.

The invention claimed is:

1. A method of making an article, the method comprising:
   a) converting an amorphous polymer to an induced crystalline polymeric powder wherein the amorphous polymer is polycarbonate or polyetherimide,
   b) placing the induced crystalline polymeric powder in a powder bed,
   c) fusing a portion of the induced crystalline polymeric powder in the powder bed,
   d) recovering a least a portion of the crystalline polymeric powder from the powder bed, wherein the recovered powder is not fused,
   e) placing the recovered induced crystalline polymeric powder in a second powder bed, and
   f) fusing at least a portion of the recovered induced crystalline polymeric powder in the second powder bed to form an amorphous polymer article.

2. The method of claim 1, wherein the amorphous polymer is polycarbonate.

3. The method of claim 2, wherein the induced crystalline polymeric powder comprises, based on the weight of the induced crystalline polymeric powder, 0.5 to 100 parts per million by weight of methanol.

4. The method of claim 2, wherein the induced crystalline polymeric powder comprises, based on the weight of the induced crystalline polymeric powder, 0.5 to 100 parts per million by weight of methanol; and 0.5 to 100 parts per million by weight of acetone.

5. The method of claim 1, wherein the amorphous polymer is polyetherimide.

6. The method of claim 5, wherein the induced crystalline polymeric powder has a weight average molecular weight of 15,000 to 50,000 grams/mole, determined by gel permeation chromatography using poly[2,2'-bis(4-(3,4-dicarboxyphenoxy)phenylpropane)-1,3-phenylene bisimide] standards; and wherein the induced crystalline polymeric powder comprises, based on the weight of the induced crystalline polymeric powder, 10 to 500 parts per million by weight of ortho-dichlorobenzene.

7. The method of claim 1, wherein the induced crystalline polymeric powder has a particle size distribution, determined by laser diffraction according to ISO 13320-1, characterized by a Dv10 value in a range of 10 to 50 micrometers; a Dv50 value in a range of 30 to 90 micrometers; and a Dv90 value in a range of 100 to 150 micrometers.

8. The method of claim 1, further comprising, after said recovering a least a portion of the crystalline polymeric powder from the powder bed, and before said placing the recovered induced crystalline polymeric powder in a second powder bed:
   crushing and sieving the recovered portion of the crystalline polymeric powder to yield a recovered and sieved portion of the crystalline polymeric powder;
   wherein said placing the recovered induced crystalline polymeric powder in a second powder bed comprises placing the recovered and sieved portion of the crystalline polymeric powder in the second powder bed.

* * * * *